Figure 1:
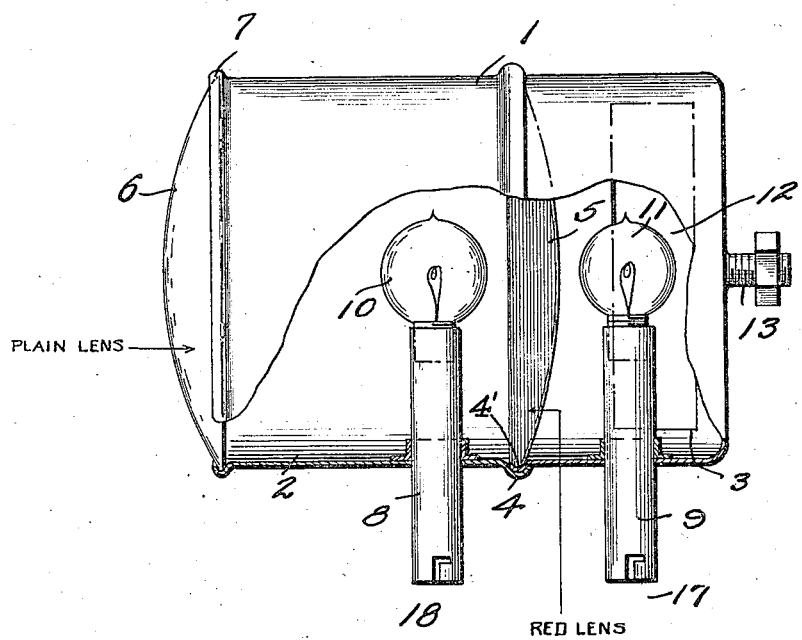

Feb. 13, 1923.

R. E. DEWEY.
VEHICLE LIGHT.
FILED MAR. 20, 1922.

1,444,831.

PLAIN LENS

RED LENS

Ray E. Dewey, Inventor

Patented Feb. 13, 1923.

1,444,831

UNITED STATES PATENT OFFICE.

RAY E. DEWEY, OF SYLVANIA, OHIO.

VEHICLE LIGHT.

Application filed March 20, 1922. Serial No. 545,183.

*To all whom it may concern:*

Be it known that I, RAY E. DEWEY, a citizen of the United States, residing at Sylvania, in the county of Lucas and State of Ohio, have invented certain new and useful Improvements in a Vehicle Light, of which the following is a specification.

The present invention relates to a vehicle light having for its principal object to provide in combination a tail light and rear light so that a warning signal may be provided on the rear of the vehicle and when needed such as is in backing the vehicle a light may be had which will illuminate the path of the vehicle to the rear.

Another important object of the invention is to combine the two above named features in a signal casing which may be attached to vehicles now commonly in use.

A further object of the invention is to provide an automobile light of this nature which will be simple and efficient in construction, reliable in operation, capable of being manufactured at a comparatively low cost, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:—

Figure 2:
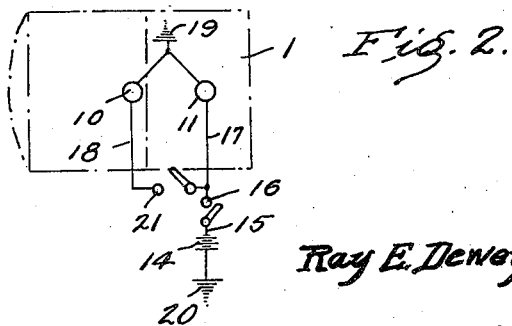

Figure 1 is an elevation of the device embodying my invention, portions thereof being broken away so as to illustrate the interior structure thereof, and Figure 2 is a diagrammatic view showing the electric wiring desired in connection with the invention.

Referring to the drawing in detail it will be seen that the housing is illustrated generally by the numeral 1 and includes a front compartment 2 and a rear compartment 3 which are joined in substantially permanent relation to each other as at 4. A bead is also provided at 4 for receiving a preferably red bead 4' in which is disposed a lens 5, while a plain lens 6 is situated in an annular bead 7 provided at the forward end of the compartment 2. A socket 8 is situated so as to extend into the compartment 2 and a similar socket 9 is situated so as to extend into the compartment 3. A source of illumination 10 such as an electric bulb is positioned on the inner end of the socket 8 and a similar device 11 is situated on the inner end of the socket 9. The compartment 3 is provided with an opening 12 so that rays of light may pass therethrough for illuminating the license tag. A suitable threaded bracket lug 13 extends from the housing 1 at any desired point depending on the construction of the vehicle in connection with which the device is to be used and in the present modification is shown extending centrally from the forward end of the housing 1.

Referring to the diagram in Figure 2 it will be seen that any suitable source of electrical energy 14 is provided from which passes a wire 15 in which is positioned a switch 16. This wire 15 is branched beyond the switch so as to form the sections 17 and 18. The wire 17 leads to the source of illumination 11 which is grounded at 19 while the wire 18 leads to the source of illumination 10 which is also grounded at 19. The source of electrical energy 14 is grounded at 20. A switch 21 is provided in the wire 18. This diagram merely illustrates the fact that the device is operable and of course may be varied to suit the vehicle to which the invention is to be attached. Referring to the example which I have illustrated in Figure 2, however, it will be seen that when the device is to be used as a tail light at night the switch 16 is closed and the switch 21 is open and that therefore the electric bulb 11 will be illuminated and the rays passing through the red lens 5 will give a warning to vehicles to the rear and that the rays passing through the opening 12 will illuminate the license tag. If it is desired, however, to back up the vehicle the switch 21 is closed thereby illuminating the electric bulb 10 so that rays of light may be projected through the plain lens 6 to the rear of the vehicle thereby illuminating its path.

It is thought that the advantages, the operation, and the construction of my invention will now be clearly understood without a more detailed description thereof. It is to be understood, however, that numerous changes in construction, and in the combination and arrangement of parts may be resorted to without departing from the spirit of the invention as hereinafter claimed.

Having thus described my invention what I claim as new is:—

In combination a casing formed in a pair of sections, one of said section having open ends, beads provided at each end of one of the sections, a bead provided at one end of the other section, the other end of the second mentioned section being closed, said bead of the second mentioned section receivable in one of the beads of the first mentioned section, a colored lens receivable in the bead of the second mentioned section, a second lens received in the free bead of the first mentioned section and a source of illumination situated in each section.

In testimony whereof I affix my signature in presence of two witnesses.

RAY E. DEWEY.

Witnesses:
M. VAN FOSSEN,
M. H. CARTWRIGHT.